United States Patent [19]
Mullersman et al.

[11] 3,928,792
[45] Dec. 23, 1975

[54] METHOD OF RESETTING THERMOSTAT USED WITH TEMPERATURE CONTROLLED CHARGING

[75] Inventors: Ferdinand Henry Mullersman; James Edward Sarisky, both of Gainesville, Fla.

[73] Assignee: General Electric Company, Columbus, Ohio

[22] Filed: Feb. 24, 1975

[21] Appl. No.: 552,289

[52] U.S. Cl. ................. 320/35; 320/2; 337/348
[51] Int. Cl.² ............................................ H02J 7/04
[58] Field of Search ................. 320/2–5, 35, 320/36, 54; 335/143; 337/348

[56] References Cited
UNITED STATES PATENTS

| | | |
|---|---|---|
| 2,955,245 | 10/1960 | Payne ................................. 320/35 |
| 3,518,524 | 6/1970 | Roszyk ................................ 320/2 |
| 3,601,679 | 8/1971 | Braun et al. ....................... 320/35 |
| 3,750,076 | 7/1973 | Hines ................................ 337/348 |
| 3,763,416 | 10/1973 | Jache .................................. 320/35 |

Primary Examiner—J. D. Miller
Assistant Examiner—Robert J. Hickey
Attorney, Agent, or Firm—Dennis A. Dearing; Donald J. Voss; Frank L. Neuhauser

[57] ABSTRACT

A cordless appliance comprising a rechargeable battery power supply adapted for temperature-controlled fast charging; a manual reset thermostat thermally coupled to the battery for terminating fast charging of the battery; and a switching mechanism for simultaneously connecting the battery power supply to a load and for resetting the thermostat to a closed condition, thereby permitting fast charging of the battery upon the connection of the appliance to a charging source.

8 Claims, 2 Drawing Figures

METHOD OF RESETTING THERMOSTAT USED WITH TEMPERATURE CONTROLLED CHARGING

BACKGROUND OF THE INVENTION

This invention relates to cordless electrical appliances and, more particularly, to such appliances having a rechargeable battery power supply adapted for temperature-controlled fast charging.

Rechargeable batteries such as nickel-cadmium (Ni-Cd) batteries are commonly used as a power supply for cordless electrical appliances, such as, electric knives, shavers, soldering irons and other similar devices. One feature which has contributed to the increasing popularity of such appliances is the present technical capability to fast charge the battery power supply between periods of use (i.e., load energization).

As is well known, when charging a Ni-Cd battery at fast rates (e.g., at a C-rate and faster), there is a sharp rise in battery temperature near the point at which the battery goes into overcharge. The temperature rise is caused by the onset of oxygen generation and its recombination reaction in the cell. The battery temperature can be easily monitored by sensing the cell case temperature. Because of these facts, temperature-controlled fast charging methods are often used to fast charge Ni-Cd batteries. For such an objective, appliances are often designed to incorporate an appliance charging circuit including a temperature-actuated switch such as a thermostat, which is thermally coupled to the battery, and which electrically couples the battery to the charger. A charging source, preferably a constant current source, is typically incorporated into a holder for the appliance and is selectively connectable to the appliance by placement of the appliance into the holder. Once the switch has opened to terminate the fast charge, the charger normally goes into a slow charge rate, or trickle charge rate to insure that a fully charge state is obtained.

It has been found that a manual reset, temperature-actuated switch, such as a manual reset thermostat, is preferable to an automatically resetting temperature-actuated switch for temperature controlled fast charging of sealed nickel-cadmium batteries. This is because of the desirability of latching the fast charge rate off when the battery temperature has risen to the predetermined value, thereby to prevent the fast charge rate from being cycled on and off as could occur if an automatically resetting thermostat is used. The continued exposure of the battery to high temperatures by such cycling can lead to damage of the battery. However, after each use of the appliance (i.e., after the battery is discharged), it is desirable that the appliance charging circuit be reset for fast charging of the battery upon return of the cordless appliance to the charger, thereby to avoid the need for a specific resetting action by the user.

Accordingly, an object of the invention is to provide an improved cordless appliance and charging technique therefor.

Another object of this invention is to provide a switch mechanism for automatically resetting the appliance charging circuit for fast charge after each use of the appliance.

SUMMARY OF THE INVENTION

These and other objects of the invention which will be apparent from a consideration of the following detailed description and the accompanying claims are accomplished by a cordless appliance comprising an electrically operable load; a rechargeable battery for energizing said load; a temperature-actuated switch, thermally coupled to said battery, for terminating fast charging of said battery responsive to battery temperature; a switch mechanism for simultaneously energizing said load and resetting said temperature-actuated switch to a position permitting a fast charge to be applied to said battery upon connection of the appliance to a charging source.

DESCRIPTION OF THE PREFERRED EMBODIMENTS

Figure 1:
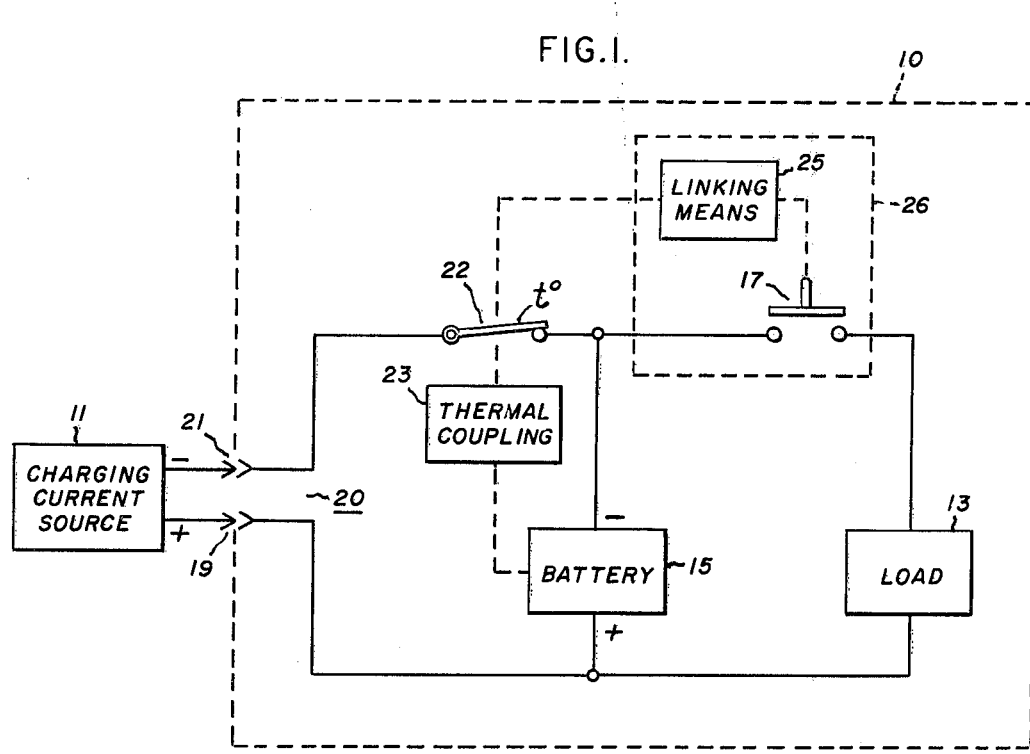
FIG. 1 is a schematic diagram of a cordless appliance in accordance with the present invention.

In FIG. 1, there is schematically shown a cordless electrical appliance 10, such as a soldering iron, electric knife, shave, or other similar devices. The appliance 10 is adapted for periodic use and for temperature-controlled fast charging of a rechargeable battery power supply 15 of appliance 10 between the periods of use by connection of appliance 10 to a charging current source 11. The appliance 10 includes a suitable load 13 which, for example, in the case of a soldering iron, is an electrically heated tip. The load is connectable across a battery 15, which is preferably comprised of one or more sealed Ni-Cd cells via a suitable trigger switch means 17, here shown as a spring-return, circuit closing switch.

Recharging of the battery 15 is accomplished via the charging current source 11 which is of any conventional construction, such as an AC transformer with half-wave rectification or an AC transformer with full wave rectification. The charging source 11 is preferably built into a stand or holder (not shown) for the appliance 10, or, if desired, may constitute a unit separate from the holder. Battery 15 is connectable to the charging current source 11 via a suitable pair of terminals 19 and 21 of an appliance charging circuit 20. The charging circuit 20 is selectively completed in accordance with the operation of a temperature-actuated switch 22 of any conventional construction. As shown in FIG. 1, one suitable choice for the switch 22 is a manual reset thermostat such as Type No. L110 2400 M1-120, manufactured by Elmwood Sensors Company. Such thermostats, as is well know, are comprised of a pair of electrical contacts (not shown), which includes a heat sensing mechanism for latching open the contacts at temperatures above a predetermined temperature level and a reset button for resetting the contacts to a closed position at temperatures below a second predetermined level. The heat sensor (not shown) of the thermostat 22 is thermally coupled via a thermal coupling means 23 to the battery 15, thereby to actuate the thermostat 22 responsive to battery temperature.

In accordance with the features of this invention, a switching mechanism 26, comprised of trigger switch 17 and a linking means 25, is provided for simultaneously energizing the appliance load 13 and resetting the temperature-actuated switch 22 so that upon the return of the appliance to its holder (not shown), after use, the appliance circuit 20 is conditioned for fast charge of the battery 15. The linking means 25 which links the operation of switch 17 to temperature-actuated switch 22 is preferably constructed of a mechanical linkage for coupling the movement of trigger switch 17, which energizes load 13, to the reset button (not shown in FIG. 1) of temperature-actuated switch 22.

In a typical operation of the appliance 10 and the charging source 11, the battery 15 which can be comprised of two, 1 Ah, Ni-Cd cells, is initially fast charged at a C-rate until the battery reaches an approximately fully charged state indicated by a predetermined cell case temperature, such as 110° F. The cell case temperature is transmitted to the thermostat 22 via the thermal coupling means 23 and automatically causes the thermostat 22 to be switched from a first, closed position to a second, open position responsive to the sensing of said predetermined temperature by the heat sensor of thermostat 22. Preferably the battery is then placed on trickle charge (e.g., at a C/10 rate) via a bypass resistor (not shown) in parallel with thermostat 22 to assure that the battery reaches a fully charged condition, as is well known in the art. The appliance 10 is then ready for removal from the appliance holder for use. The appliance 10 is actuated for use via a trigger switch means 17 which completes the circiut between the battery 15 and the load 13 resulting in the energization of the load. Simultaneously with the movement of the trigger switch means 17 from a first, open position to a second, closed position thereby energizing the load, the thermostat is reset from its second, open position to its first, closed position by linking means 25, if the thermostat temperature is less than the second predetermined temperature level. After use, the appliance 10 is replaced in its holder and is thereby connected to the charging source 11. This initiates fast charging unless the battery temperature is above the predetermined actuation temperature of the temperature-actuated switch 22. If the battery temperature is below the actuation temperature, the fast charging is immediately started and is continued until either the appliance is disconnected from charging source 11 or the fast charge rate is terminated, as explained hereinbefore, by the battery reaching an approximately fully charge state indicated by the cell case temperature.

Figure 2:
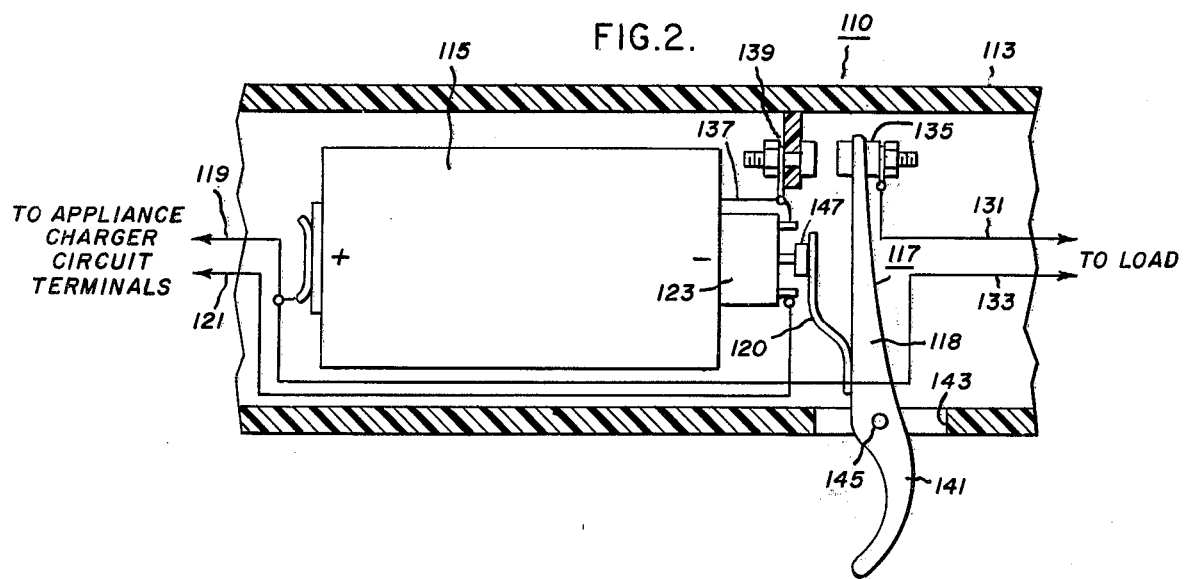
FIG. 2 is a fragmentary sectional view of one exemplary embodiment of a cordless appliance of the type schematically shown in FIG. 1.

In FIG. 2, there is shown a fragmentary sectional view of the casing of one exemplary embodiment of a cordless appliance 110 of the type schematically shown in FIG. 1. The appliance 110 is comprised of a case 113 which houses a battery power supply 115 and a switch mechanism 117, which mechanism 117 is comprised of a trigger switch arm 118 and a spring arm linking means 120.

An appliance charging circuit for fast charging the battery 115 is formed by lead 119, one end of which is directly connected to the positive battery terminal, and lead 121, one end of which is connectable to the negative battery terminal through a manual reset thermostat 123. The other ends of leads 119,121 are connected to a pair of terminals (not shown) adapted for connection to a charging source.

An appliance load (not shown) is connectable across the battery 115 through a trigger switch means 118 via a load circuit formed by lead 131, which is connected between a first contact 135 of a trigger switch arm 118 and one side of the load; by lead 133, which is connected between the positive terminal of the battery 115 and the other side of the load; and by lead 137 which is connected between the negative terminal of the battery 115 and a second terminal 139 of the trigger switch means 118.

The trigger switch arm 118 is pivotably mounted in an opening 143 in casing 113 via a pivot 145, for opening and closing trigger switch contacts 135,139. The spring arm linking means 120 is affixed to one side of the trigger switch arm 118 and is biased into contact with a plunger type reset button 147 of the thermostat 123 when the arm 118 is pivoted to close the contacts 135,139.

The thermostat 123 is thermally coupled by welding or other conventional means to the battery 115, thereby to cause actuation of the thermostat switch contacts responsive to the cell case temperature of the battery. Other arrangements of the thermostat 123 and battery 115 can be made to accommodate the size and space limitations of other case designs.

While the present invention has been described with respect to specific embodiments thereof, it will be appreciated by those skilled in the art that there are other equally advantageous embodiments of the switching mechanism for simultaneously energizing the load and resetting the temperature-actuated switch. Accordingly, it is intended that the appended claims cover all such modifications and embodiments which fall within the true spirit and scope of the present invention.

What I claim as new and desire to secure by Letters Patent of the United States is:

1. A battery-operated apparatus comprising:
   a. an electrically operable load;
   b. a rechargeable battery for energizing said load,
   c. temperature-actuated switch means, thermally coupled to battery, said switch having first and second positions, said switch automatically shifting from said first to said second position responsive to an increase of the temperature of said battery above a predetermined level;
   d. a switch mechanism for simultaneously energizing said load and for resetting said temperature-actuated switch to said first position.

2. The apparatus of claim 1 further comprising an appliance charging circuit for connecting said battery to a charging source through said temperature-actuated switch.

3. The apparatus of claim 1 wherein said temperature-actuated switch is a manual reset thermostat.

4. A battery-operated apparatus comprising:
   a. an electrically operable laod;
   b. a rechargeable battery for energizing said load;
   c. temperature-actuated switch means, thermally coupled to battery, said switch having first and second positions, said switch automatically shifting from said first to said second position responsive to an increase of the temperature of said battery above a predetermined level;
   d. trigger switch means, connected in circuit between said battery and said load, for energizing and deenergizing said load in first and second trigger positions, respectively; and
   e. linking means for shifting said temperature switch means from said second position to said first position responsive to the shifting of said trigger means from one of said trigger positions to the other of said trigger positions.

5. The apparatus of claim 4 wherein said temperature switch means is a thermostat, said thermostat comprising a reset means postitioned for cooperation with said linking means to reset said thermostat to said first position.

6. The apparatus of claim 4 wherein said one and said other trigger positions are said second and said first trigger positions.

7. The apparatus of claim 4 further comprising terminal means for connection to a battery charger; and charge circuit means for forming an electrical path between said terminal and said battery, said temperature switch means connected in said circuit means for controlling the transmission of current on said circuit means, said first and second temperature switch positions being closed and open switch positions.

8. A cordless appliance comprising:
 a. a case having an opening therein;
 b. an electrically operable load;
 c. a rechargeable battery mounted in said housing;
 d. a thermostatic switch, thermally coupled to said battery, the contacts of said switch having open and closed positions, said switch automatically shifting from said closed position to said open position responsive to an increase of the temperature of said battery above a predetermined level, said switch comprising a reset button for shifting the contacts of said switch from said open position to said closed, and said reset button being located in said case in a position preventing direct manual access thereto;
 e. a trigger switch means, connected in circuit between said battery and said load, said trigger switch having open and closed positions for deenergizing and energizing said load, respectively, and said trigger means having a portion thereof disposed adjacent said opening and being movable by the application of pressure to change the position of said trigger switch means; and
 f. linking means for engaging said reset button to shift said contacts from said open to said closed position responsive to the shifting of said trigger means from said open position to said closed position.

* * * * *